US012111676B2

(12) United States Patent
Iadicicco et al.

(10) Patent No.: US 12,111,676 B2
(45) Date of Patent: Oct. 8, 2024

(54) BANDGAP CIRCUIT WITH LOW POWER CONSUMPTION

(71) Applicant: Apple Inc., Cupertino, CA (US)

(72) Inventors: Giulio Maria Iadicicco, Munich (DE); Angelo Bassi, Munich (DE)

(73) Assignee: APPLE INC., Cupertino, CA (US)

(*) Notice: Subject to any disclaimer, the term of this patent is extended or adjusted under 35 U.S.C. 154(b) by 235 days.

(21) Appl. No.: 17/947,465

(22) Filed: Sep. 19, 2022

(65) Prior Publication Data

US 2024/0103557 A1 Mar. 28, 2024

(51) Int. Cl.
*G05F 3/26* (2006.01)

(52) U.S. Cl.
CPC .................................... *G05F 3/265* (2013.01)

(58) Field of Classification Search
CPC .................................. G05F 3/265; G05F 3/30
See application file for complete search history.

(56) References Cited

U.S. PATENT DOCUMENTS 6,060,874 A 5/2000 Doorenbos
6,812,684 B1 * 11/2004 Leifhelm .................. G05F 3/30 323/312
8,461,912 B1 * 6/2013 Kumar ...................... G05F 3/30 327/539
2014/0203794 A1 7/2014 Pietri et al.

OTHER PUBLICATIONS

Ivanov, V. et al. "An Ultra Low Power Bandgap Operational at Supply from 0.75 V." IEEE Journal of Solid-State Circuits, vol. 47, No. 7, Jul. 2012, pp. 1515-1523.
Liu, M. et al. "A 106nW 10b 80kS/s SAR ADC with Duty-Cycled Reference Generation in 65 nm CMOS." IEEE Journal of Solid-State Circuits, vol. 51, No. 10, Oct. 2016, pp. 2435-2445.
Martin, K. et al. "A Differential Switched-Capacitor Amplifier." IEEE Journal of Solid-State Circuits, vol. SC-22, No. 1, Feb. 1987, pp. 104-106.

* cited by examiner

*Primary Examiner* — Jue Zhang
*Assistant Examiner* — Afework S Demisse
(74) *Attorney, Agent, or Firm* — Sterne, Kessler, Goldstein & Fox P.L.L.C.

(57) ABSTRACT

A bandgap circuit that is area efficient and has a low power consumption. The bandgap circuit includes a voltage generator circuit, and a sample and hold circuit coupled to the voltage generator circuit. The voltage generator circuit includes a pair of transistors each connected in a diode configuration and biased with a respective current source of a plurality of current sources of the voltage generator circuit. During a sample phase, the sample and hold circuit samples a first voltage between a first base and a first emitter of a first transistor of the pair of transistors and a second voltage between a second base and a second emitter of a second transistor of the pair of transistors. During a hold phase subsequent to the sample phase, the sample and hold circuit generates an output voltage as a combination of the sampled first and second voltages.

20 Claims, 8 Drawing Sheets

In Sample Phase

In Hold Phase

BANDGAP CIRCUIT WITH LOW POWER CONSUMPTION

BACKGROUND

1. Field of the Disclosure

The present disclosure relates to a circuit for providing a voltage reference, and more specifically to a bandgap circuit with low power consumption.

2. Description of the Related Arts

Bandgap circuits are used nowadays in many applications where the voltage reference is required, e.g., in battery powered applications. The typical bandgap topology includes a voltage generator circuit with bipolar junction transistors (BJTs) and resistors. An electrical current flowing through the BJTs is inversely proportional to an overall resistance in the voltage generator circuit. To reduce the overall current consumption, high resistances (e.g., in the order of tens of MOhms) are typically utilized in the voltage generator circuit. However, there are two main drawbacks in using such big resistances for the design of bandgap circuit. First, the higher are the resistances, the bigger the layout area of bandgap circuit is needed. For example, to compensate for temperature variations, an output of the voltage generator circuit has a fixed voltage, e.g., around 1.2V. A voltage divider is then required to scale it down and obtain a desired voltage. The voltage divider is typically made of high resistances to limit the overall current consumption, which leads to a larger layout area. Second, the level of noise in bandgap circuit can be prohibitively high as the white noise generated from the resistances is proportional to their high values.

SUMMARY

Embodiments of the present disclosure relate to a bandgap circuit that is area efficient and has a low power consumption. The bandgap circuit includes a voltage generator circuit, and a sample and hold circuit coupled to the voltage generator circuit. The voltage generator circuit includes a pair of transistors each connected in a diode configuration and biased with a respective current source of a plurality of current sources of the voltage generator circuit. During a sample phase, the sample and hold circuit is configured to sample a first voltage between a first base and a first emitter of a first transistor of the pair of transistors and a second voltage between a second base and a second emitter of a second transistor of the pair of transistors. During a hold phase subsequent to the sample phase, the sample and hold circuit is configured to generate an output voltage as a combination of the sampled first and second voltages.

Figure 1:
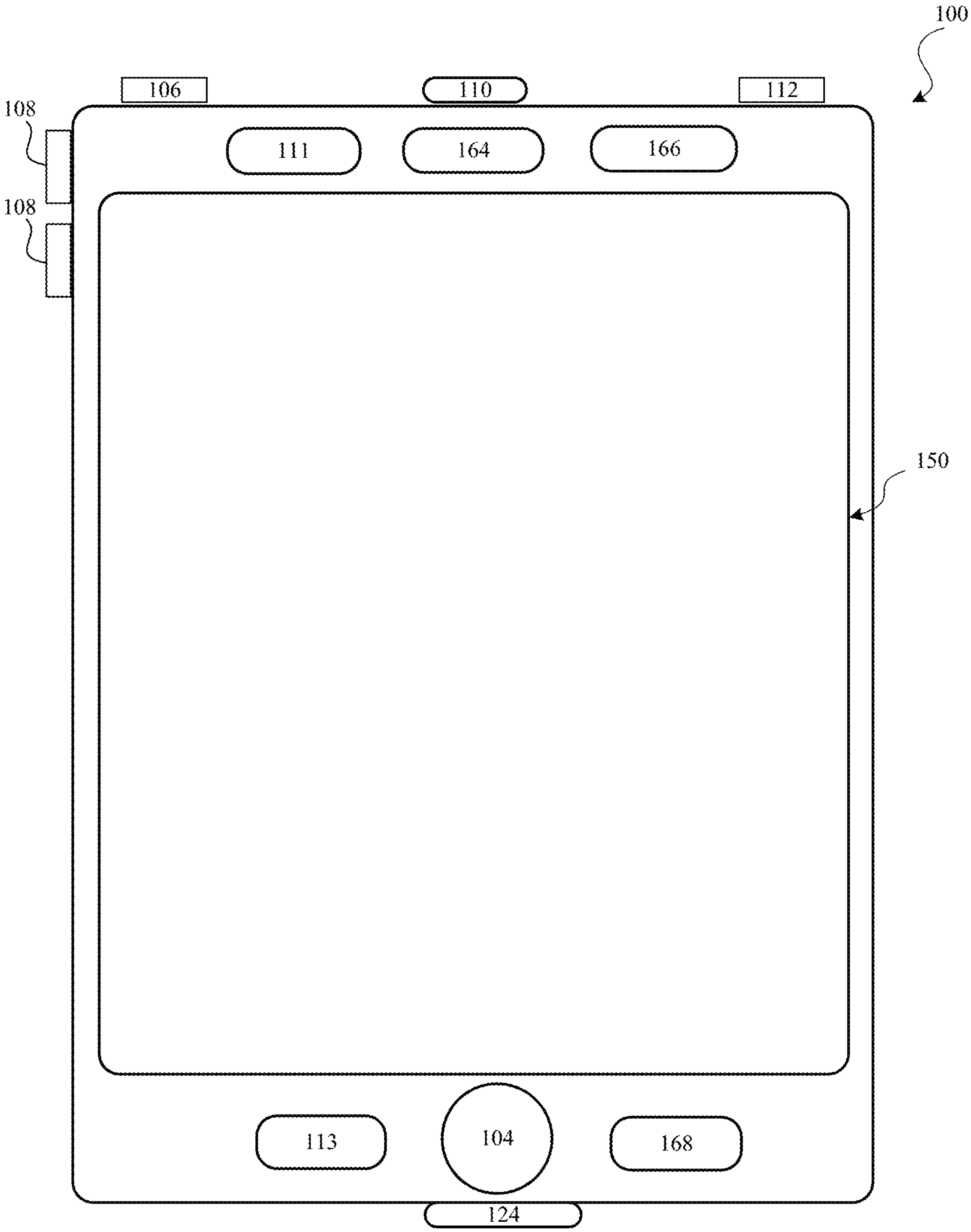
FIG. 1 is a high-level diagram of an electronic device, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a bandgap circuit that is area efficient and has low power consumption (e.g., low current consumption). The bandgap circuit presented herein includes a voltage generator circuit, and a sample and hold circuit coupled to the voltage generator circuit. The voltage generator circuit includes a pair of transistors (e.g., bipolar junction transistors (BJTs)) connected in a diode configuration and biased using two fixed current sources. The voltage generator circuit generates a pair of voltages—a first voltage between a base and an emitter of a first transistor in the pair, and a second voltage between a base and an emitter of a second transistor in the pair. During a sample phase of the sample and hold circuit, the sample and hold circuit samples the first and second voltages generated by the voltage generator circuit. During a hold phase of the sample and hold circuit that is subsequent to the sample phase, the sample and hold circuit buffers the first and second voltages and generates an output voltage of the bandgap circuit by combining the buffered first and second voltages. The first and second voltages are buffered to make the output voltage independent of any possible load and/or leakage. The generated output voltage is stable and robust to process-voltage-temperature (PVT) variations. The bandgap circuit presented herein has a substantially reduced layout area compared to the standard BJT-based bandgap circuits as the bandgap circuit presented herein does not require large resistances to limit current consumption.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. Additionally or alternatively, image sensors 164 may be associated with different lens configuration. For example, device 100 may include rear image sensors, one with a wide-angle lens and another with as a telephoto lens. Device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100. Device 100 may perform various operations including image processing.

Figure 2:
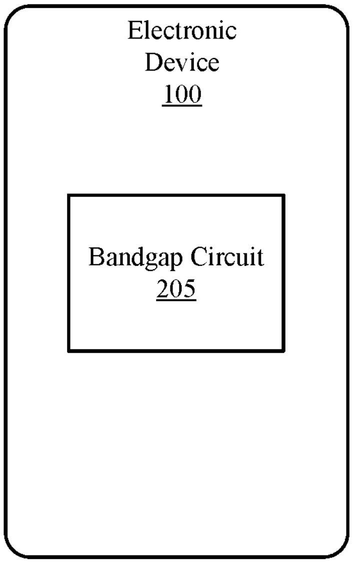
FIG. 2 is a block diagram illustrating the electronic device with a bandgap circuit, according to one embodiment.

FIG. 2 is a block diagram illustrating device 100 with a bandgap circuit 205, according to one embodiment. Device 100 may include other components that are not illustrated in FIG. 2. Bandgap circuit 205 may generate a reference voltage that is powered from a non-constant supply voltage. The reference voltage is stable and robust to PVT variations. The reference voltage may be provided from bandgap circuit 205 to one or more other components of device 100. An area of bandgap circuit 205 is small as no resistances are required to limit current consumption. Thus, bandgap circuit 205 represents a low power consumption and area efficient bandgap circuit. Details about a structure and operations of bandgap circuit 205 are provided below in relation to FIGS. 3 through 6.

Example Bandgap Circuit

Figure 3:
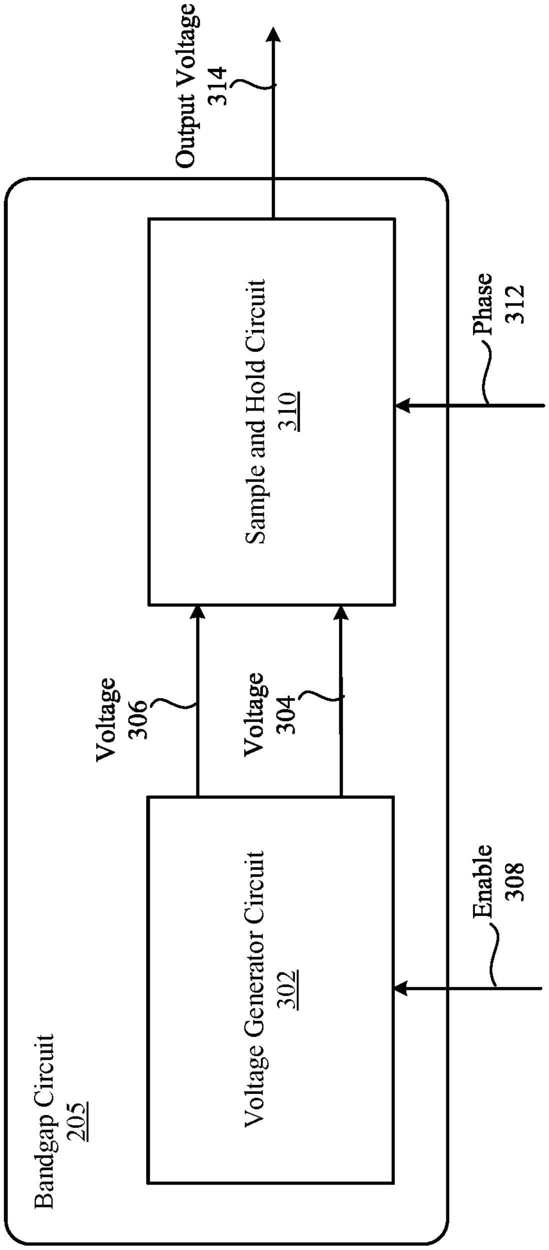
FIG. 3 is a block diagram of a bandgap circuit, according to one embodiment.

FIG. 3 is a block diagram of bandgap circuit 205, according to one embodiment. Bandgap circuit 205 includes a voltage generator circuit 302 and a sample and hold circuit 310 coupled to voltage generator circuit 302. Bandgap circuit 205 may include additional components not shown in FIG. 3.

When enabled (e.g., via a first value of enable signal 308), voltage generator circuit 302 may generate a first voltage 304 and a second voltage 306 that are both provided to sample and hold circuit 310. When disabled (e.g., via a second value of enable signal 308), voltage generator circuit 302 may be turned off to save power. Enable signal 308 may be a bit signal having a defined low voltage value (e.g., representing the bit value of "0") that may disable voltage generator circuit 302, and a defined high voltage value (e.g., representing the bit value of "1") that may enable voltage generator circuit 302. Enable signal 308 may be generated by a component of device 100 separate from bandgap circuit 205. Alternatively, enable signal 308 may be generated by an additional component that is part of bandgap circuit 205 (not shown in FIG. 3). Details about a structure and operation of voltage generator circuit 302 are provided below in relation to FIG. 4 and FIG. 6.

Sample and hold circuit 310 may operate in a sample phase, as well as in a hold phase subsequent to the sample phase, based on a value of a phase signal 312. A next sample phase may follow the hold phase, a next hold phase may follow the next sample phase, and so on. During the sample phase, voltage generator circuit 302 may be enabled (e.g., via the first value of enable signal 308) to generate first voltage 304 and second voltage 306, and sample and hold circuit 310 may be configured (e.g., via a first value of phase signal 312) to sample first voltage 304 and second voltage 306. During the hold phase, voltage generator circuit 302 may be disabled (e.g., via the second value of enable signal 308), and sample and hold circuit 310 may be configured (e.g., via a second value of phase signal 312) to buffer first voltage 304 and second voltage 306 that were sampled previously. Furthermore, during the hold phase, sample and hold circuit 310 may generate an output voltage 314 as a combination of the sampled/buffered first voltage 304 and the sampled/buffered second voltage 306.

Phase signal 312 may be a bit signal having a defined low voltage value (e.g., representing the bit value of "0"), and a defined high voltage value (e.g., representing the bit value of "1"). When having the bit value of "1", phase signal 312 may configure sample and hold circuit 310 to operate in the sample phase (or in the hold phase). Similarly, when having the bit value of "0", phase signal 312 may configure sample and hold circuit 310 to operate in the hold phase (or in the sample phase). Phase signal 312 may be generated by a component of device 100 separate from bandgap circuit 205. Alternatively, phase signal 312 may be generated by an additional component that is part of bandgap circuit 205 (not shown in FIG. 3). The hold phase (e.g., as configured by the first value of phase signal 312) may last longer than the sample phase (e.g., as configured by the second value of phase signal 312), which further limits power consumption at bandgap circuit 205 because voltage generator circuit 302 may be disabled (e.g., turned off) during the longer hold phase of sample and hold circuit 310. More details about a structure and operation of sample and hold circuit 310 are provided below in relation to FIGS. 5A-5C and FIG. 6.

Figure 4:
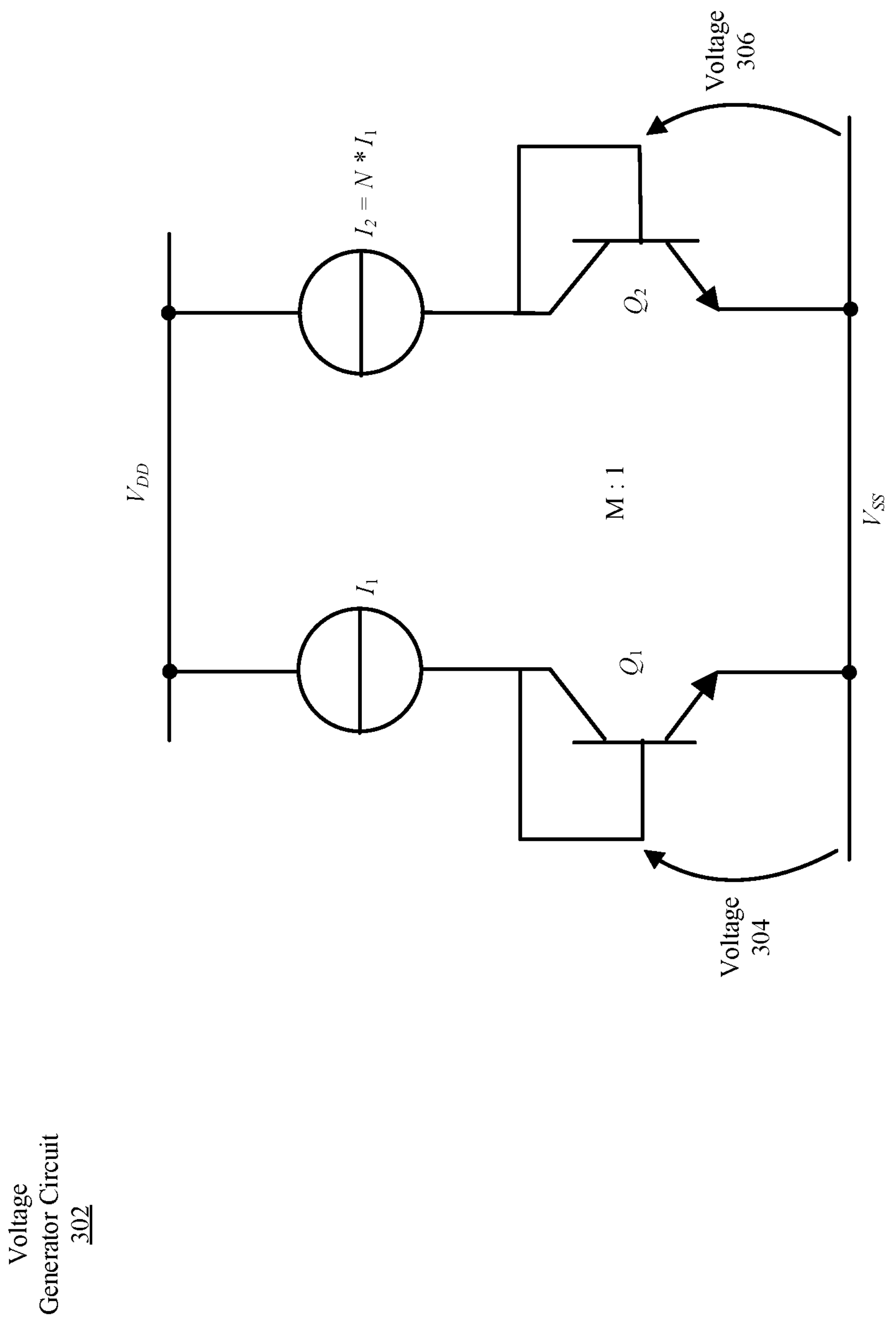
FIG. 4 is a circuit diagram of a voltage generator circuit of a bandgap circuit, according to one embodiment.

FIG. 4 is a circuit diagram of voltage generator circuit 302, according to one embodiment. Voltage generator circuit 302 may generate first voltage 304 and second voltage 306. Voltage generator circuit 302 may include a pair of transistors, i.e., a first transistor, $Q_1$, and a second transistor, $Q_2$. The first and second transistors, $Q_1$ and $Q_2$, may be implemented as bipolar junction transistors (BJTs). Each of the first and second transistors, $Q_1$ and $Q_2$, may be connected in a diode configuration, i.e., a base and collector of each of the first and second transistors, $Q_1$ and $Q_2$, may be shorted together. A size of the first transistor, $Q_1$, may be M times larger than a size of the second transistor, $Q_2$, where M is an integer greater than one (e.g., M=8).

Voltage generator circuit 302 may further include a pair of current sources, e.g., a first current source having the current value of $I_1$ and a second current source having the current value of 12. Each of the first and second transistors, $Q_1$ and $Q_2$, may be biased with a respective current source of the pair of current sources. The first transistor, $Q_1$, may be biased by the first current source, $I_1$, e.g., the first current source, $I_1$, may be connected to the collector of the first transistor, $Q_1$. The second transistor, $Q_2$, may be biased by the second current source, $I_2$, e.g., the second current source, $I_2$, may be connected to the collector of the second transistor, $Q_2$. Both the first and second current sources, $I_1$ and $I_2$, may be supplied by a positive supply voltage, $V_{DD}$. The value of the second current source, $I_2$, may be N times greater than the value of the first current source, $I_1$, e.g., $I_2=N*I_1$, where N is an integer greater than one (e.g., $I_1$=400 nA, $I_2$=1.2 μA, and N=3). Thus, an electrical current of the second current source, $I_2$, may be a scaled up version of an electrical current of the first current source, $I_1$. In some embodiments, an electrical current of the first current source, $I_1$, may be provided from sample and hold circuit 310. In one or more embodiments, the second current source, $I_2$, is implemented as a current mirror of the first current source, $I_1$.

First voltage 304 generated by voltage generator circuit 302 may be a voltage between a base and an emitter of the first transistor, $Q_1$. The emitter of the first transistor, $Q_1$, may be directly connected to a negative supply voltage, Vss. Second voltage 306 generated by voltage generator circuit 302 may be a voltage between a base and an emitter of the second transistor, $Q_2$. The emitter of the second transistor, $Q_2$, may be directly connected to the negative supply voltage, Vss.

As aforementioned, both first and second voltages 304 and 306 may be generated during the sample phase of sample and hold circuit 310, when voltage generator circuit 302 is enabled (e.g., via enable signal 308). Voltage generator circuit 302 may be disabled (e.g., turned off) during the hold phase of sample and hold circuit 310, e.g., to save power. A defined value of enable signal 308 (e.g., the defined low voltage value or the bit value of "0") may disable voltage generator circuit 302, e.g., by turning off both the first and second transistors, $Q_1$ and $Q_2$, and turning off both the first and second current sources, $I_1$ and $I_2$.

Considering the current densities of the first and second transistors, $Q_1$ and $Q_2$, the difference between second voltage 306 (e.g., $V_{be2}$) and first voltage 304 (e.g., $V_{be1}$), $\Delta V_{be}$, can be given by:

$$\Delta V_{be} = V_{be2} - V_{be1} = V_T \ln(M \cdot N), \text{ with } V_T = \frac{kT}{q}, \tag{1}$$

where $V_T$ is a thermal voltage (e.g., approximately 28.85 mV at room temperature of 300 K), k is the Boltzmann constant ($k=1.38\times10^{-23}$ J·K$^{-1}$), q is the magnitude of electrical charge on the electron ($q=1.602\times10^{-19}$ C), and T is an absolute temperature. The compensation in temperature can be achieved by combining properly first voltage 304, $V_{be1}$, and second voltage 306, $V_{be2}$. Thus, a bandgap voltage, $V_{bg}$, independent of temperature variations, may be obtained by combining first voltage 304, $V_{be1}$, and second voltage 306, $V_{be2}$, as:

$$V_{bg} = V_{be2} + \alpha \Delta V_{be} = (\alpha+1)V_{be2} - \alpha V_{be1}, \tag{2}$$

$$\text{with } \alpha = -\frac{\delta V_{be2}}{\delta T}\frac{q}{k}\frac{1}{\ln(M \cdot N)}.$$

Figure 5A:
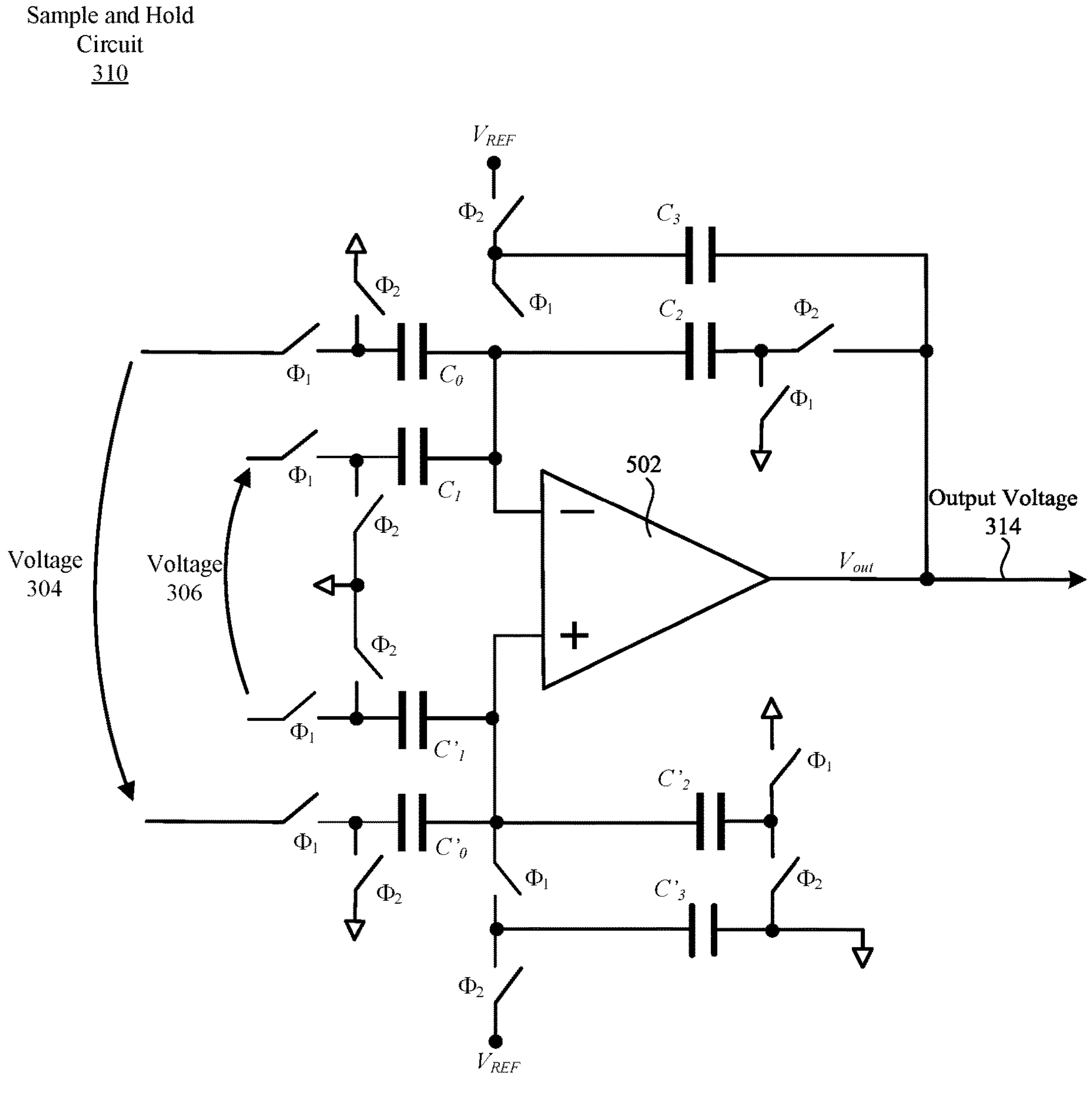
FIG. 5A is a circuit diagram of a sample and hold circuit of a bandgap circuit, according to one embodiment.

FIG. 5A is a circuit diagram of sample and hold circuit 310, according to one embodiment. The structure of sample and hold circuit 310 is based on an operational amplifier 502 connected to multiple capacitors via a set of switches (e.g., controlled by phase signal 312) in the differential switched capacitor amplifier configuration. Sample and hold circuit 310 may bias periodically the first and second transistors, $Q_1$ and $Q_2$, in voltage generator circuit 302 for a defined (e.g., short) amount of time, thus facilitating a low average current consumption at voltage generator circuit 310 and bandgap circuit 205. The switches in sample and hold circuit 310 may, in various embodiments, be implemented using one or more metal-oxide semiconductor field-effect transistors (MOSFETs), one or more fin field-effect transistors (FinFETs), one or more gate-all-around field-effect transistors (GAAFETs), or any other suitable switching devices.

Sample and hold circuit 310 may sample and hold first voltage 304, $V_{be1}$, and second voltage 306, $V_{be2}$, generated by voltage generator circuit 302. Sample and hold circuit 310 may compensate the temperature variation by combining properly first voltage 304, $V_{be1}$, and second voltage 306, $V_{be2}$, to generate output voltage 314 independent of the temperature variation. Furthermore, sample and hold circuit 310 may buffer output voltage 314, e.g., to make output voltage 314 independent from any possible load and/or leakage. Sample and hold circuit 310 may also scale down output voltage 314, e.g., to make a level of output voltage 314 suitable for one or more components in device 100.

As aforementioned, sample and hold circuit 310 may operate in the sample phase (e.g., $\Phi_1$ phase) and the hold phase (e.g., $\Phi_2$ phase) subsequent to the sample phase, which may repeat multiple times. Switches in sample and hold circuit 310 labeled as $\Phi_1$ in FIG. 5A may be closed during the sample phase (e.g., $\Phi_1$ phase) and open during the hold phase (e.g., $\Phi_2$ phase), e.g., based on appropriate values of phase signal 312 in the sample and hold phases. Similarly, switches in sample and hold circuit 310 labeled as $\Phi_2$ in FIG.

5A may be closed during the hold phase (e.g., $\Phi_2$ phase) and open during the sample phase (e.g., $\Phi_1$ phase), e.g., based on appropriate values of phase signal 312 in the hold and sample phases.

During the sample phase (e.g., $\Phi_1$ phase) of sample and hold circuit 310, voltage generator circuit is enabled (e.g., via enable signal 308), and sample and hold circuit 310 may sample first voltage 304, $V_{be1}$, and second voltage 306, $V_{be2}$, generated by voltage generator circuit 302. During the hold phase (e.g., $\Phi_2$ phase) of sample and hold circuit 310, voltage generator circuit 302 may be held in off state to save power, and sample and hold circuit 310 may generate output voltage 314, $V_{out}$, by combining properly sampled first and second voltages 304 and 306, $V_{be1}$ and $V_{be2}$, e.g., as:

$$V_{out} = \frac{C_1}{C_2}V_{be2} - \frac{C_0}{C_2}V_{be1}, \quad (3)$$

where $C_0$, $C_1$, and $C_2$ are capacitances of corresponding capacitors shown in FIG. 5A.

A duration of the hold phase of sample and hold circuit 310 (e.g., duration $T_{hold}$) may be set to last longer than a duration of the sample phase of sample and hold circuit 310 (e.g., duration $T_{sample}$). Since voltage generator circuit 302 may be turned off during the time duration $T_{hold}$ (e.g., during the hold phase of sample and hold circuit 310) the average quiescent current ($I_Q$) of voltage generator circuit 302 may be reduced by a factor $T_{sample}/T_{hold}$. The factor $T_{sample}/T_{hold}$ may be configurable (e.g., based on phase signal 312), and may be equal to, e.g., 1/32, 1/64, 1/96, 1/128. The quiescent current ($I_Q$) of voltage generator circuit 302 may correspond to a sum of currents of the first current source, $I_1$, and the second current source, $I_2$, i.e., $I_1+I_2=(N+1)\cdot I_1$. The value of $I_1$, and hence the quiescent current ($I_Q$), may be chosen according to the duration of the sample phase, $T_{sample}$, and leakage currents of the first and second transistors, $Q_1$ and $Q_2$, in voltage generator circuit 302. As the first current source, $I_1$, may charge the sampling capacitors in sample and hold circuit 310 during the sample phase, higher the current value $I_1$ is, lower can be the duration of the sample phase, $T_{sample}$. Furthermore, since the first and second transistors, $Q_1$ and $Q_2$, have different sizes, the first and second transistors, $Q_1$ and $Q_2$, feature different leakage currents. To avoid compromising the temperature compensation (e.g., especially at high temperatures), the current values $I_1$ and $I_2$ may be chosen high enough to make the leakage currents of the first and second transistors, $Q_1$ and $Q_2$, negligible.

Figure 5B:
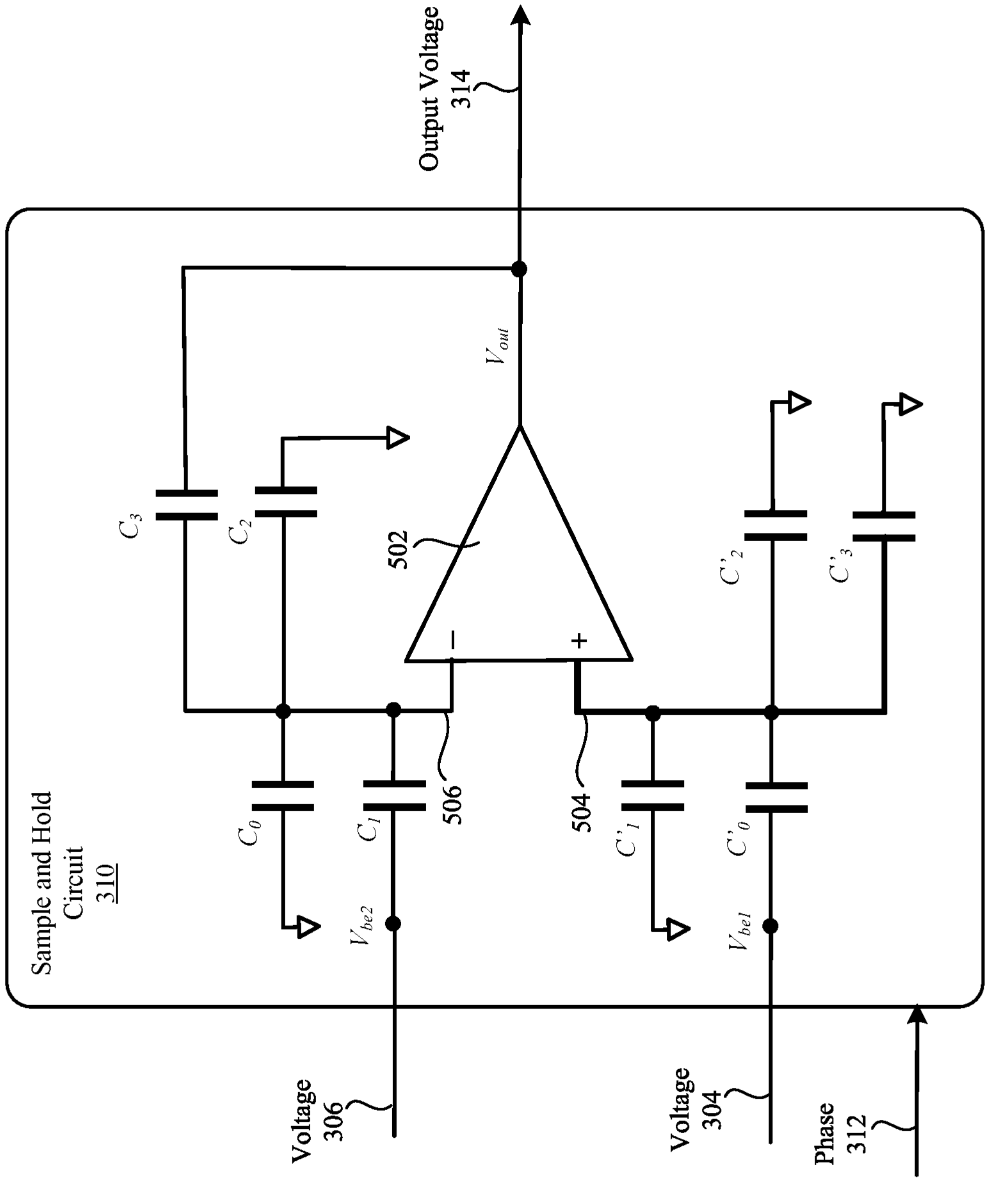
FIG. 5B is a circuit diagram of the sample and hold circuit in a sample phase, according to one embodiment.

FIG. 5B is a circuit diagram of sample and hold circuit 310 in the sample phase, $\Phi_1$, according to one embodiment. During the sample phase, $\Phi_1$, sample and hold circuit 310 may sample first voltage 304, $V_{be1}$, by the capacitor $C'_0$, and may sample second voltage 306, $V_{be2}$, by the capacitor $C_1$. The capacitor $C'_0$ may be connected between the base of the first transistor, $Q_1$, in voltage generator circuit 302 and a first input 504 of operational amplifier 502 in sample and hold circuit 310. The capacitor $C_1$ may be connected between the base of the second transistor, $Q_2$, in voltage generator circuit 302 and a second input 506 of operational amplifier 502 in sample and hold circuit 310. Additionally, sample and hold circuit 310 may sample (e.g., via capacitors $C_0$, $C_1$, $C_2$, $C'_0$, $C'_1$, $C'_2$) an offset voltage of operational amplifier 502, so that the offset voltage will be canceled in the hold phase, $\Phi_2$.

Figure 5C:
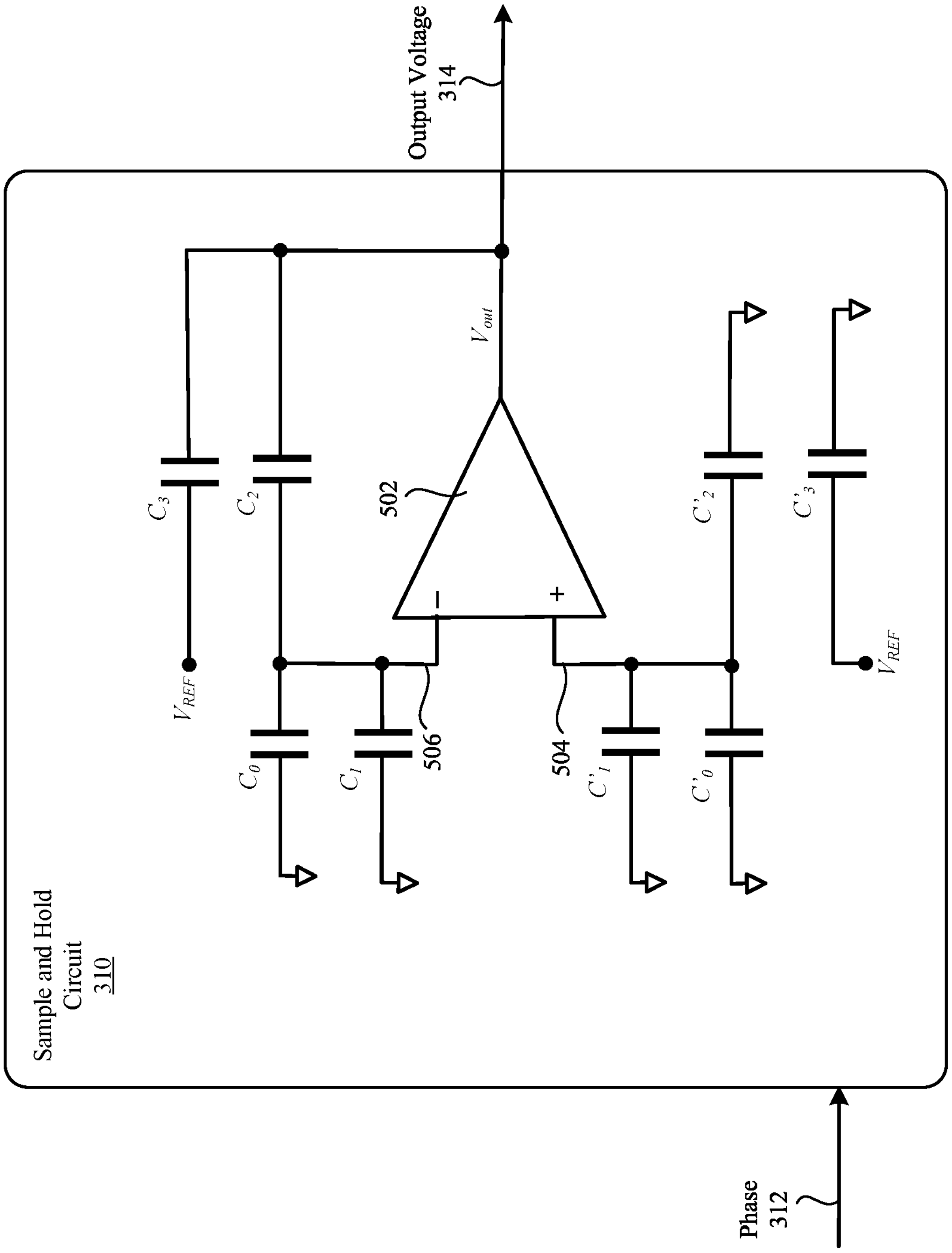
FIG. 5C is a circuit diagram of the sample and hold circuit in a hold phase, according to one embodiment.

During a previous hold phase (e.g., during a hold phase, $\Phi_2$, prior to the next sample phase, $\Phi_1$, of sample and hold circuit 310 shown in FIG. 5B), the capacitor $C'_3$ was charged at a reference voltage, $V_{REF}$ (e.g., as shown in FIG. 5C). Thus, during the next sample phase, $\Phi_1$, the capacitor $C'_3$ may keep first input 504 of operational amplifier 502 at the reference voltage, $V_{REF}$. Hence, during the next sample phase, $\Phi_1$, second input 506 of operational amplifier 502 may be also kept at the reference voltage, $V_{REF}$. Due to the pre-charge occurring during the previous hold phase, it is possible to bias first and second inputs 504, 506 of operational amplifier 502 at a desired voltage, e.g., at the reference voltage, $V_{REF}$. The reference voltage, $V_{REF}$ may be set to, e.g., a desired value of output voltage 314, $V_{out}$, generated during the next hold phase, $\Phi_2$. During the previous hold phase, $\Phi_2$, the capacitor $C_3$ was charged at $V_{REF}-V_{out}$ (e.g., as shown in FIG. 5C). Thus, during the next sample phase, $\Phi_1$, the capacitor $C_3$ may keep output voltage 314, $V_{out}$, at the same voltage level as during the previous hold phase, $\Phi_2$. In this manner, output voltage 314, $V_{out}$, may not change substantially between the previous hold phase, $\Phi_2$, and the next sample phase, $\Phi_1$, which may allow relaxing speed requirements for operational amplifier 502.

FIG. 5C is a circuit diagram of sample and hold circuit 310 in the hold phase, $\Phi_2$, according to one embodiment. During the hold phase, $\Phi_2$, positive plates of the sampling capacitors $C'_0$ and $C_1$ may be discharged. Thus, for charge sharing, the voltage at first input 504 of operational amplifier 502, $V_{in}^+$, and consequently the voltage at second input 506 of operational amplifier 502, $V_{in}^-$, may decrease from the reference voltage, $V_{REF}$, to:

$$V_{in}^- = V_{in}^+ = \left(V_{REF} - V_{be1}\frac{C_0'}{C_0' + C_1' + C_2'}\right). \quad (4)$$

The capacitor $C_1$, charged during the sample phase at $V_{REF}-V_{be2}$ (e.g., as shown in FIG. 5B), may discharge during the hold phase on the capacitors $C_0$, $C_1$ and $C_2$. During the hold phase, positive plates of the capacitors $C_1$ and $C'_0$, may be discharged from the reference voltage $V_{REF}$ (e.g., as shown in FIG. 5B) to the voltage given by expression in equation (4). Applying conservation of the charge at second input 506 of operational amplifier 502 in the sample phase, $\Phi_1$, and the hold phase, $\Phi_2$, the following can be obtained:

$$Q_{TOT}(\Phi_1) = C_1V_{be2} + V_{REF}(C_0' + C_1' + C_2'), \quad (5)$$

$$Q_{TOT}(\Phi_2) = \left(V_{REF} - V_{be1}\frac{C_0'}{C_0' + C_1' + C_2'}\right)(C_0 + C_1 + C_2) - -V_{out}C_2 - C_1V_{be2} + V_{REF}(C_0' + C_1' + C_2') == \left(V_{REF} - V_{be1}\frac{C_0'}{C_0' + C_1' + C_2'}\right)(C_0 + C_1 + C_2) - V_{out}C_2, \quad (6)$$

where $Q_{TOT}(\Phi_1)$ is a total charge at second input 506 of operational amplifier 502 during the sample phase, $\Phi_1$, and $Q_{TOT}(\Phi_2)$ is a total charge at second input 506 of operational amplifier 502 during the hold phase, $\Phi_2$.

After equating expressions in equations (5) and (6), and setting corresponding capacitances such that $C'_0=C_0$, $C'_1=C_1$, $C'_2=C_2$, output voltage 314 during the hold phase, $\Phi_2$, may be given as:

$$V_{out} = \frac{C_1}{C_2}V_{be2} - \frac{C_0}{C_2}V_{be1}. \quad (7)$$

Thus, sample and hold circuit 310 may generate output voltage 314, $V_{out}$, during the hold phase, $\Phi_2$, as a scaled version of second voltage 306 subtracted by a scaled version of first voltage 304.

The desired value of output voltage 314, $V_{out}$, generated during the hold phase, $\Phi_2$, may be obtained by performing an appropriate capacitance sizing. The desired value of output voltage 314, $V_{out}$, may be obtained by scaling the bandgap voltage given by equation (2) for a constant K. Thus, the desired value of output voltage 314, $V_{out}$, may be obtained as:

$$V_{out}=KV_{bg}=K[(1+\alpha)V_{be2}-\alpha V_{be1}]. \quad (8)$$

For example, considering the desired value of output voltage 314, $V_{out}$, to be 600 mV, the constant K may be approximately equal to 0.5. By choosing properly the capacitance values in sample and hold circuit 310, both the compensation in temperature and the regulation can be achieved. By equating the expressions in equations (7) and (8), the capacitance values in sample and hold circuit 310 can be selected such that:

$$K(1+\alpha)=\frac{C_0}{C_2};\ K\alpha=\frac{C_1}{C_2}. \quad (9)$$

To summarize, bandgap circuit 205 having a low power consumption and reduced area size is presented herein. Bandgap circuit 205 may include voltage generator circuit 302 coupled to sample and hold circuit 310. Voltage generator circuit 302 may generate first voltage 304, $V_{be1}$, and second voltage 306, $V_{be2}$, by applying a pair of current sources to the first transistor, $Q_1$, and the second transistor, $Q_2$, in voltage generator circuit 302. Sample and hold circuit 310 may then combine first voltage 304, $V_{be1}$, and second voltage 306, $V_{be2}$, to obtain the compensation in temperature and the desired voltage reference. An area of voltage generator circuit 302 is reduced substantially compared to the traditional low power BJT-based bandgap because voltage generator circuit 302 does not require huge resistances to limit the current consumption. Furthermore, capacitances used in sample and hold circuit 310 show better mismatch performances compared to resistances used in traditional bandgaps, which allows a higher accuracy pre-trim and smaller variations of generated output voltage 314, $V_{out}$. Sample and hold circuit 310 coupled to voltage generator circuit 302 allows to have the compensation in temperature, the scaling of bandgap voltage, and the reduction in average quiescent current ($I_Q$) in one single solution.

Example Process of Operating Bandgap Circuit

Figure 6:
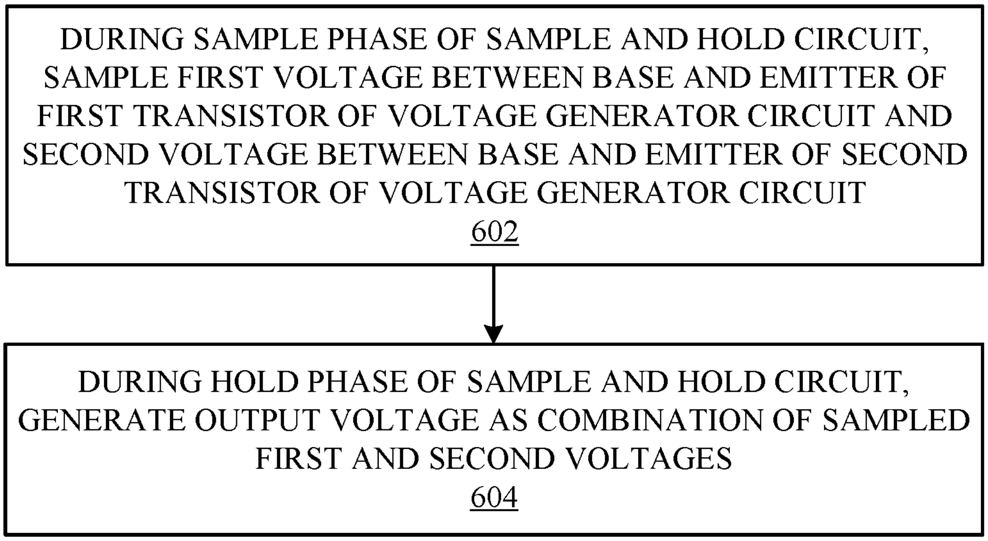
FIG. 6 is a flowchart illustrating a method of operating a bandgap circuit, according to one embodiment.

FIG. 6 is a flowchart illustrating a method of operating a bandgap circuit (e.g., bandgap circuit 205), according to one embodiment. During a sample phase of a sample and hold circuit of the bandgap circuit, the bandgap circuit samples 602 (e.g., via a sample and hold circuit) a first voltage between a first base and a first emitter of a first transistor of a voltage generator circuit of the bandgap circuit and a second voltage between a second base and a second emitter of a second transistor of the voltage generator circuit.

The first and second transistors may be bipolar junction transistors. Each of the first and second transistors may be connected in a diode configuration and biased with a respective current source of a plurality of current sources of the voltage generator circuit. A first current source of the plurality of current sources may be connected to a first collector of the first transistor, and a second current source of the plurality of current sources may be connected to a second collector of the second transistor. A second current of the second current source may be a scaled up version of a first current of the first current source.

During the sample phase, the voltage generator circuit may be enabled, and the bandgap circuit may generate (e.g., via the voltage generator circuit) the first and second voltages. During the sample phase, the bandgap circuit may sample (e.g., via the sample and hold circuit) the first voltage by a first capacitor connected between the first base of the first transistor and a first input of an operational amplifier of the sample and hold circuit. During the sample phase, the bandgap circuit may further sample (e.g., via the sample and hold circuit) the second voltage by a second capacitor connected between the second base of the second transistor and a second input of the operational amplifier. During the sample phase, the first and second inputs of the operational amplifier may be biased (e.g., from the first and second capacitors) to a reference voltage.

During a hold phase of the sample and hold circuit subsequent to the sample phase, the bandgap circuit generates 604 (e.g., via the sample and hold circuit) an output voltage as a combination of the sampled first and second voltages.

The voltage generator circuit may be disabled during the hold phase. During the hold phase, the bandgap circuit may buffer (e.g., via the sample and hold circuit) the sampled first and second voltages. The hold phase may have a duration longer than a duration of the sample phase. The reference voltage may be set to be equal the output voltage generated during the hold phase. During the hold phase, a voltage at the first and second inputs of the operational amplifier may decrease. During the hold phase, the second capacitor may discharge on a plurality of capacitors of the sample and hold circuit. During the hold phase, the output voltage may be generated as a scaled version of the second voltage subtracted by a scaled version of the first voltage.

Embodiments of the process as described above with reference to FIG. 6 are merely illustrative. Moreover, sequence of the process may be modified or omitted.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A bandgap circuit comprising:

a voltage generator circuit including a pair of transistors each connected in a diode configuration and biased with a respective current source of a plurality of current sources of the voltage generator circuit; and a sample and hold circuit coupled to the voltage generator circuit, the sample and hold circuit configured to:

sample, during a sample phase, a first voltage between a first base and a first emitter of a first transistor of the pair of transistors and a second voltage between a second base and a second emitter of a second transistor of the pair of transistors, and generate, during a hold phase subsequent to the sample phase, an output voltage as a combination of the sampled first and second voltages.

2. The bandgap circuit of claim 1, wherein, during the sample phase, the voltage generator circuit is enabled and generates the first and second voltages.

3. The bandgap circuit of claim 1, wherein the voltage generator circuit is disabled during the hold phase.

4. The bandgap circuit of claim 1, wherein, during the hold phase, the sample and hold circuit is further configured to buffer the sampled first and second voltages.

5. The bandgap circuit of claim 1, wherein the hold phase has a duration longer than a duration of the sample phase.

6. The bandgap circuit of claim 1, wherein a first current source of the plurality of current sources is connected to a first collector of the first transistor and a second current source of the plurality of current sources is connected to a second collector of the second transistor.

7. The bandgap circuit of claim 6, wherein a second current of the second current source is a scaled up version of a first current of the first current source.

8. The bandgap circuit of claim 1, wherein, during the sample phase, the sample and hold circuit is further configured to:

sample the first voltage by a first capacitor connected between the first base of the first transistor and a first input of an operational amplifier of the sample and hold circuit; and sample the second voltage by a second capacitor connected between the second base of the second transistor and a second input of the operational amplifier.

9. The bandgap circuit of claim 8, wherein, during the sample phase, the first and second inputs of the operational amplifier are biased to a reference voltage.

10. The bandgap circuit of claim 9, wherein the reference voltage is set to the output voltage generated during the hold phase.

11. The bandgap circuit of claim 8, wherein, during the hold phase, a voltage at the first and second inputs of the operational amplifier decreases.

12. The bandgap circuit of claim 8, wherein:

the second capacitor discharges during the hold phase on a plurality of capacitors of the sample and hold circuit; and the output voltage is generated during the hold phase as a scaled version of the second voltage subtracted by a scaled version of the first voltage.

13. The bandgap circuit of claim 1, wherein the first and second transistors are bipolar junction transistors.

14. A method of operating a bandgap circuit, the method comprising:

sampling, during a sample phase of a sample and hold circuit of the bandgap circuit, a first voltage between a first base and a first emitter of a first transistor of a voltage generator circuit of the bandgap circuit and a second voltage between a second base and a second emitter of a second transistor of the voltage generator circuit, each of the first and second transistors connected in a diode configuration and biased with a respective current source of a plurality of current sources of the voltage generator circuit; and generating, during a hold phase of the sample and hold circuit subsequent to the sample phase, an output voltage as a combination of the sampled first and second voltages.

15. The method of claim 14, further comprising:

enabling the voltage generator circuit during the sample phase to generate the first and second voltages; and disabling the voltage generator circuit during the hold phase.

16. The method of claim 14, further comprising:

buffering, by the sample and hold circuit, the sampled first and second voltages during the hold phase.

17. The method of claim 14, further comprising:

sampling, during the sample phase, the first voltage by a first capacitor of the sample and hold circuit connected between the first base of the first transistor and a first input of an operational amplifier of the sample and hold circuit; and sampling, during the sample phase, the second voltage by a second capacitor of the sample and hold circuit connected between the second base of the second transistor and a second input of the operational amplifier.

18. The method of claim 17, further comprising:

connecting, during the sample phase, the first and second inputs of the operational amplifier to a reference voltage; and setting the reference voltage to the output voltage generated during the hold phase.

19. The method of claim 17, further comprising:

decreasing, during the hold phase, a voltage at the first and second inputs of the operational amplifier.

20. The method of claim 17, further comprising:

discharging the second capacitor during the hold phase on a plurality of capacitors of the sample and hold circuit; and generating the output voltage during the hold phase as a scaled version of the second voltage subtracted by a scaled version of the first voltage.

* * * * *